United States Patent Office 2,726,313
Patented Dec. 6, 1955

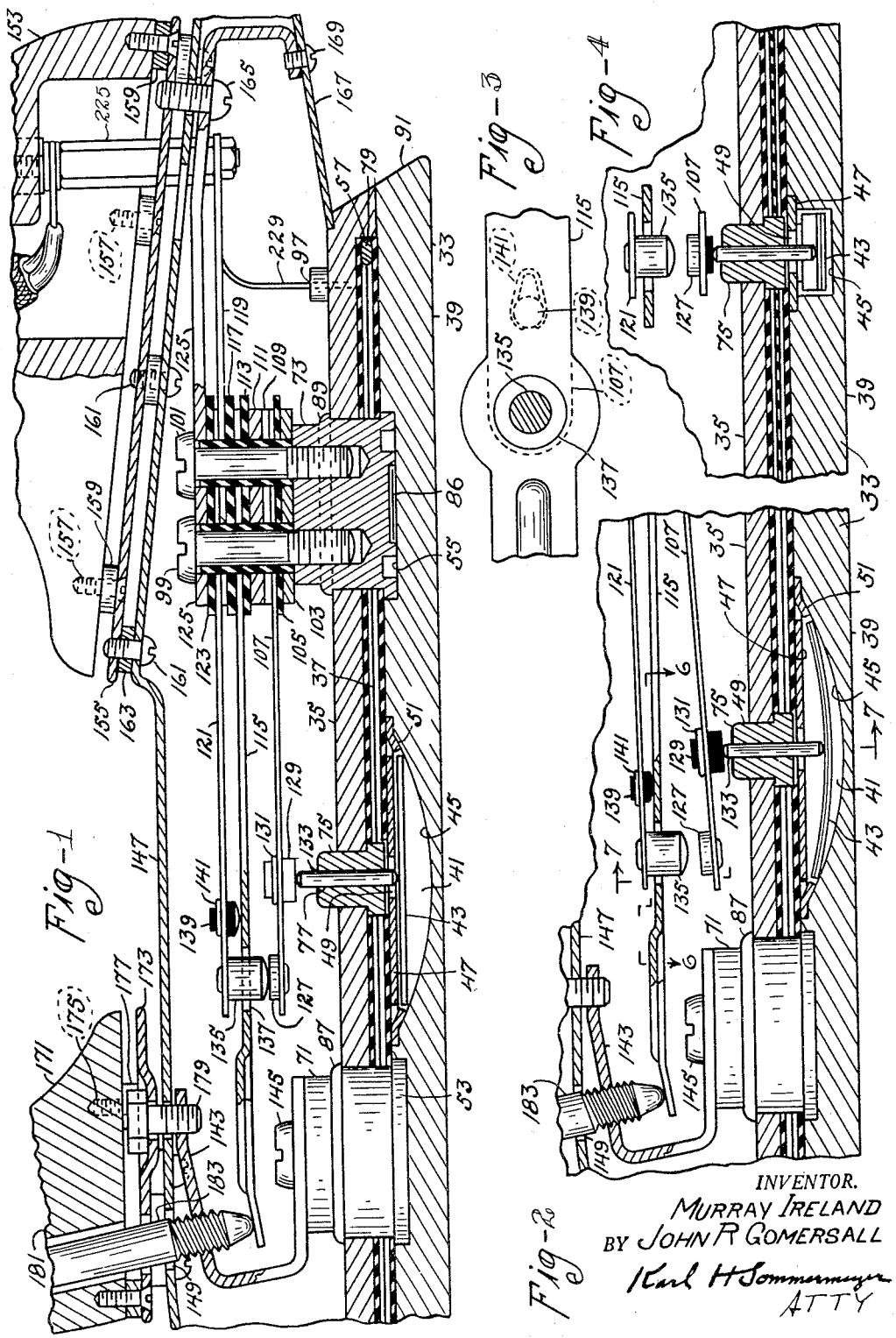

2,726,313

ELECTRIC IRON AND THERMALLY RESPONSIVE CONTROL SWITCH THEREFOR

John R. Gomersall, Elgin, and Murray Ireland, near Elgin, Ill., assignors to McGraw Electric Company, Elgin, Ill., a corporation of Delaware Original application April 2, 1945, Serial No. 586,099, now Patent No. 2,585,928, dated February 19, 1952. Divided and this application February 18, 1952, Serial No. 272,221

5 Claims. (Cl. 219—25)

Our invention relates to sadirons and particularly to electrically heated sadirons. The same constitutes one of the various inventions originally included in our prior copending application Ser. No. 586,099, filed April 2, 1945, now Patent 2,585,928, granted February 19, 1952, to which the present application is related as a divisional application.

An object of the invention is to provide an electrically heated iron controlled by a novel thermally responsive switch and constructed so that the switch operates in close relationship with the temperature of the ironing surface of the sole plate and so that the temperature of the thermal element of the switch varies in close time relationship with temperature variations of the ironing surface.

Another object of the invention is to provide a light weight electrically heated iron embodying a thin sole plate which responds quite rapidly to heating and cooling influences and to provide for efficient regulation of the heating element by a thermally responsive switch suitable to such thermal characteristics of the sole plate.

Another object of the invention is to provide a light weight electrically heated iron having low heat storage capacity and high thermal conductivity and to provide correct automatically controlled heating for such iron.

Still another object of the invention is to provide an improved thermostatic control switch for electric irons.

Other objects of our invention will either be apparent from a description of one form of device embodying our invention or will be set forth in the course of such description and particularly in the appended claims.

In the drawings,

Fig. 1 is a fragmentary, longitudinal, sectional view on the center line of an electric iron and including the control switch of the invention, the contacts being shown in the positions they will occupy when the iron is heating up, Fig. 2 is a fragmentary view similar to Fig. 1 except that the contacts are shown in the positions they will occupy when the iron has been heated and the heater has been deenergized, Fig. 3 is a fragmentary horizontal sectional view taken on the line 6—6 of Fig. 2, Fig. 4 is a vertical, lateral, sectional view taken on the line 7—7 of Fig. 2.

Referring first of all to Fig. 1 of the drawings, we have there shown an electric iron which comprises a relatively thin metal sole plate 33, a relatively thin top plate 35, and an electric heating element 37, these three members constituting the heated body portion of an electric iron. The sole plate is composed of metal of high thermal conductivity. The top plate should also be of a metal of high heat conductivity since, as will hereinafter appear, the same is secured at its margins in heat conducting relation with the sole plate for the transfer of heat thereto should occasion require. Because of their thinness and to insure against warping the top plate and sole plate should have the same or substantially the same coefficient of expansion. We prefer to make them of the same metal.

We have shown a relatively thin metal sole plate 33 which may be punched or otherwise shaped from a relatively thin bright-surface sheet of metal, such as brass. We do not desire, however, to be limited to brass since other metals may be used in place of brass although we prefer metals or alloys of high thermal conductivity. It may be here mentioned that we prefer to use high yellow brass and that the thickness of sole plate 33 is on the order of ⅛". The sole plate 33 has an ironing surface 39 on its underside.

The top or clamping plate 35 is formed also from a relatively thin metal plate and has a recess 57 in its lower surface for receiving the electric heating element 37. We prefer to make the top plate of high yellow brass and to make its total thickness on the order of 3⁄32", although we do not desire to be limited to the thickness mentioned.

We provide a pair of assembly plugs 71 and 73, preferably of brass or other metal of high thermal conductivity, which have a tight fit over the body portion thereof in the top plate 35, while the lower end portion has a slightly larger diameter than the said body portion, the lower end portion of plug 71 being adapted to fit into recess 53. Substantially the same comments apply to the plug 73, the lower enlarged-diameter end portion of which is adapted to fit into recess 55 in sole plate 33.

The parts described are assembled in such a way as to hold the plate over electric heating element 37 in contact and good heat exchange relation with sole plate 33. While the matter of assembly forms no part of the present invention, it is preferred to employ the method of our aforementioned Patent 2,585,928. According thereto assembly plugs 71 and 73 are cited in their recesses in the sole plate and heating element 37 and top plate 35 are assembled on the sole plate with a brazing wire between the margins of the sole plate and top plate. High pressure and brazing heat are then applied, causing the brazing wire to flatten to a thin film 79 and causing the top plate to press the heating element tightly against the sole plate. A portion of brazing film 79 is shown in Fig. 1 adjacent heel 91 of the sole plate. Brazing material 86 is also inserted in the recesses in the sole plate prior to insertion of assembly plugs 71 and 73 and under brazing heat the plugs are permanently united to the sole plate. After the brazing operation, shoulders 87 and 89 are swaged on the assembly plugs against the upper side of the top plate to hold the central area of the top plate against the heating element. It may be further mentioned that plugs 71 and 73 as well as the brazed margins of the top plate and sole plate provide good heat exchange between the two plates.

Assembly plug 73 is drilled with two holes for receiving a pair of clamping screws 99 and 101 which are adapted to clamp tightly against the upper surface of plug 73, a thermally-actuable control switch for the heating element 37. A metal plate 103 engages the upper surface of plug 73, then a sheet of mica 105, then a lower contact bar 107, then a terminal plate 109, then a second relatively heavy metal plate 111, then another sheet 113 of electric-insulating material, such as mica, then a spring arm 115, then another sheet 117 of electric-insulating material, such as mica, then a terminal plate 119, then an upper contact arm 121 and then a sheet 123 of electric-insulating material, such as mica. We provide further a casing supporting member 125 which is of substantially U-shape and all of these parts are clamped tightly against the upper surface of plug 73 between clamping screws 99 and 101.

Located in sole plate 33 below the control switch is a recess or chamber 41 lying closely adjacent ironing surface 39 of the sole plate. Suspended in such chamber by marginal engagement with the metal of the sole plate is a bimetal thermostat member of sheet material. Such bimetal member is here shown in the form of a rectangular strip or bar and chamber or recess 41 is an elongated recess to conform thereto as will be understood from Figs. 2 and 4. The opposite short margins or ends of member 43 are loosely supported at the opposite ends of the chamber so that the entire intermediate portion of the member can warp vertically in the chamber in response to the temperature of the sole plate. Chamber 41 is formed with an arcuate lower surface 45 to accommodate the curvature of bimetal member 43, which warps downwardly in the chamber in response to heating.

A thin metal cover 47 closes the top of chamber 41 and two depending bent-out portions 51 are formed adjacent each end of the top plate to serve as stops to hold bimetal member 43 in substantially its proper operative position in spite of changes in position of the assembled iron. Cover 47 is adapted to fit tightly in the upper part of chamber 41. A portion of heating element 37 extends over the cover and coacts with the heat of the sole plate itself to heat bimetal bar 43.

Cover 47 is provided with a center opening 49 over the center point of bimetal member 43 and located thereover in a hole in top plate 35 is a bushing 75 of electric-insulating high-temperature-resisting material. An opening 77 extends vertically through the center of the bushing in alinement with opening 49.

The contact bar 107 extends substantially longitudinally of the iron and has a contact member 127 on its upper surface adjacent its outer end. It also has a bushing 129 which has its major portion extending below bar 107 and which is held in proper operative position on bar 107 by a clamping member 131 of substantially U-shape. The lower surface of member 129, which is preferably made of electric-insulating material, is adapted to be engaged by the upper end of an actuating pin 133 resting upon the bimetal bar 43. The bimetal bar 43 is adapted to flex downwardly, particularly at its mid portion, upon increase of temperature and bar 107 is therefore biased in a counter-clockwise direction, so as to follow up the bimetal bar 43.

Contact bar 121 has a contact member 135 thereon and extending therebelow, adjacent its outer end which contact is adapted to extend through an opening 137 in spring arm 115 to engage contact 127, the contact bar 121 being biased in a counter-clockwise direction. Contact arm 121 has a bushing 139 thereon, extending therebelow and adjacent to contact 135, which bushing 139 is held by a spring member 141 similar to member 131.

Automatic operation of the control switch to energize and deenergize the heating element 37 is accomplished through bimetal member 43 in response to the temperature of the sole plate through the arrangement just described. Because bimetal member 43 has marginal contact with the metal of the sole plate and because of the small size of chamber 41, the bimetal member quickly responds to changes in the temperature of the sole plate. Moreover, because the bimetal member is located in proximity to the lower ironing surface 39 of the sole plate, it quickly responds to cooling influences to which the ironing surface is subjected in normal operation.

Provision is made for normally setting the control switch so that the bimetal member will cooperate with the switch to maintain the sole plate at any desired ironing temperature. A rotatable shaft 183 is provided to engage the free outer end of spring bar 115. The lower portion of control shaft 183 is threaded in the upper arm of a U-shaped bracket 143 which is mounted by a screw 145 on top of assembly plug 71. Rotation of shaft 183 causes it to move axially in bracket 143. Spring arm 115 is biased in an upward direction so as to press against the lower end of shaft 183 and will be moved up or down by the shaft according to its direction of rotation. Contact arm 121 of the switch as well as contact arm 107 are biased downwardly. Upward movement of spring arm 115 through adjustment of control shaft 183 will cause such arm to engage bushing 139 on contact arm 131 and raise the arm while downward movement of spring arm 115 upon depression by control shaft 183 will permit arm 121 to move downwardly. The control shaft thus serves as a positioning member for contact 135 on arm 121.

Only the lower portion of control shaft 183 is shown. It may be manually adjusted by any suitable control knob (not shown) mounted at its upper end and located at the top of front post 171 of the iron handle structure as will be understood by those skilled in the art. One form of control assembly for shaft 183 is shown in said Patent 2,585,928.

The iron so far described is provided with a suitable cover or casing 147, the lower edge of which is adapted to rest upon the outer peripheral surface of top plate 35. An opening 149 therein accommodates control shaft 183 of the control switch. A suitable handle is mounted on the casing, the lower rear supporting portion 153 thereof of which is shown, the same being made of a heat and electric-insulating material. Handle support 153 is adapted to be secured to an intermediate spacing plate 155 by a plurality of screws 157 and spacers 159. Plate 155 is adapted to be operatively secured against a cooperating surface of casing 147 by a plurality of screws 161, there being spacing members 163 located therebetween.

The rear end portion of the handle and of the casing are held in proper operation position relatively to the heated body by a single screw 165 extending through supporting bracket 125, through casing 147 and through plate 155. A rear closure plate 167 is secured in position by a single support screw 169 threaded in support 125. Hollow front column 171 is located at the front end of the handle and houses control shaft 183 in the vertically extending opening 181 thereof. The lower end of column 171 is secured against a spacing plate 173 by a plurality of short screws 175 with spacers 177 therebetween. Spacing plate 173 is secured against the front support 143 by a single screw 179.

Suitable electric terminals are provided in rear handle support 153. Plate 119 of the control switch connects with one of such terminals 225 while a terminal lead 229 connects with the other terminal and extends through an insulating bushing in top plate 35 to connect with heating element 37. The electric circuit from plate 19 through switch arms 121 and 107 is completed from arm 107 to the heating element through a terminal lead similar to lead 229. Operation of the control switch to make and break the circuit to the heating element has already been explained.

The thermally responsive actuating element of the control switch for the heating element is arranged to follow without lag temperature changes of the ironing surface. Being embedded in the sole plate it is close to such surface. Further, the thin and high thermal conductive sole plate is adapted to rapidly respond as a whole to temperature changes of the sole plate and to render the thermal element quickly responsive to such temperature changes. Because the thermal element is in direct contact with the sole plate near the ironing surface and is in a sealed closed chamber it is highly sensitive to the temperature of the sole plate. The location of portions of the heating element over the thermal element for heating the same compensates for the fact that while heating of the sole plate ironing surface is through thin metal, the thermal element, for operating movement can have only limited heat exchange contact with the sole plate and is surrounded by air.

Various modifications may be made in our invention without departing from the spirit or scope thereof and all such modifications coming clearly within the scope of the appended claims are to be considered as part of our invention.

We claim:
1. An electric iron comprising a metal sole plate, an electric heating element for heating the sole plate, a chamber in the sole plate, a bimetal member of sheet material freely suspended in said chamber and supported therein on a single wall of the chamber by marginal portions only of the bimetal member and being adapted to warp vertically in said chamber, a control switch for the heating element, and actuating means for the control switch actuatable by the central portion of the bimetal member.

2. An electric iron comprising a metal sole plate, an electric heating element for heating the sole plate, a chamber in the sole plate, a single surfaced supporting seat in said chamber, a bimetal member of sheet material freely suspended in said chamber and supported therein on said seat by marginal portions only of the bimetal member for vertical warping movement which is maximum in the central portion of the bimetal member, a control switch for the heating element, and actuating means for the control switch actuatable by the central portion of the bimetal member.

3. An electric iron comprising a metal sole plate, an electric heating element for heating the sole plate, a chamber in the sole plate, a single surfaced supporting seat in said chamber, a bimetal member of sheet material freely suspended in said chamber supported therein on said seat by marginal portions only of the bimetal member and having sliding supporting and heat exchange contact with said supporting seat, and a control switch for the heating element actuatable by the bimetal member.

4. An electric iron comprising a metal sole plate, an electric heating element for heating the sole plate, a chamber in the sole plate having an arcuate bottom wall, a bimetal member of sheet material freely suspended in said chamber and supported therein on said arcuate bottom wall by marginal portions only of the bimetal member for vertical downward arcuate warping movement which is maximum in the central portion of the bimetal member, a control switch for the heating element and actuating means for the control switch actuatable by the central portion of the bimetal member.

5. An electric iron comprising a metal sole plate, an electric heating element for heating the sole plate, a chamber in the sole plate, a bimetal member of sheet material freely suspended in said chamber, the bimetal member and chamber being of elongated rectangular shape, and the narrow opposite edges of the bimetal member being loosely supported in the chamber on a single wall thereof by marginal portions only of the bimetal member, a control switch for the heating element, and actuating means for the heating element actuable by an intermediate portion of the bimetal member.

References Cited in the file of this patent

UNITED STATES PATENTS

| | | |
|---|---|---|
| 1,606,037 | Myers | Nov. 9, 1926 |
| 1,733,085 | Thomas | Oct. 22, 1929 |
| 1,764,301 | Harpster | June 17, 1930 |
| 1,845,997 | Spencer | Feb. 16, 1932 |
| 2,296,591 | Barnes | Sept. 22, 1942 |
| 2,520,774 | Osterheld | Aug. 29, 1950 |